United States Patent [19]

Nett

[11] Patent Number: 4,768,426
[45] Date of Patent: Sep. 6, 1988

[54] OIL FILTER APPARATUS AND METHOD FOR DEEP OIL PRESSURE COOKING APPARATUS

[75] Inventor: Louis A. Nett, Cambridge, Wis.

[73] Assignee: Gallina Corporation, Waukesha, Wis.

[21] Appl. No.: 847,285

[22] Filed: Apr. 2, 1986

[51] Int. Cl.[4] .............................................. A47J 37/12
[52] U.S. Cl. ...................................... 99/408; 99/330; 210/167; 426/438
[58] Field of Search .................. 99/408, 330, 331, 337, 99/411, 444; 210/167, 171, DIG. 8; 426/438; 219/440, 437, 431

[56] References Cited

U.S. PATENT DOCUMENTS

| | | |
|---|---|---|
| 2,287,396 | 6/1942 | Roth . |
| 3,280,722 | 10/1966 | Rahauser ........................ 99/408 X |
| 3,438,982 | 12/1969 | Nelson . |
| 3,477,361 | 11/1969 | Bradshaw ........................ 210/167 X |
| 3,648,595 | 3/1972 | Morris . |
| 3,685,433 | 8/1972 | Cunningham ........................ 99/408 |
| 3,701,313 | 10/1972 | Boggs ........................ 99/408 X |
| 3,973,481 | 8/1976 | Mies . |
| 4,259,567 | 3/1981 | Moore et al. . |
| 4,506,995 | 3/1985 | Polster . |
| 4,519,904 | 5/1985 | Helmick . |
| 4,520,717 | 6/1985 | Bohrer, Jr. et al. . |
| 4,591,434 | 5/1986 | Prudhomme ........................ 99/408 X |
| 4,599,990 | 7/1986 | Fritzsche et al. ........................ 210/167 X |
| 4,622,135 | 11/1986 | Williams ........................ 210/167 |

Primary Examiner—James Kee Chi
Attorney, Agent, or Firm—Andrus, Sceales, Starke & Sawall

[57] ABSTRACT

Cooking oil is contained within a pressurized pot having a radiant heat to raise the oil temperature to the cooking temperature. An oil reservoir is located adjacent and below the pot, with a releasable cover for addition of oil and a low temperature heater. The pot has a bottom prefilter with a perforated basket. A drain line connects the prefilter reservoir with two series connected solenoid valves. A micron filter is connected by a fill line to a fill pipe of the pot and between the solenoid valves. A pump unit in the fill line moves the oil through the system. A low volume of oil is used for cooking of product, and advantageously is approximately in the ratio of less than two pounds to one pound of product. Oil absorbed by the product is periodically replaced with fresh oil from the reservoir. Filtering and adding of oil is in various sequences during the multiple batch cooking process. Filtering of the cooking oil may be after each couple of batches, by opening one valve while the other is and energizing the pump to circulate the oil from the pot through both filters. The operator monitors the oil level to provide fresh oil from the reservoir by reversely operating the valves from the filtering cycle.

10 Claims, 2 Drawing Sheets

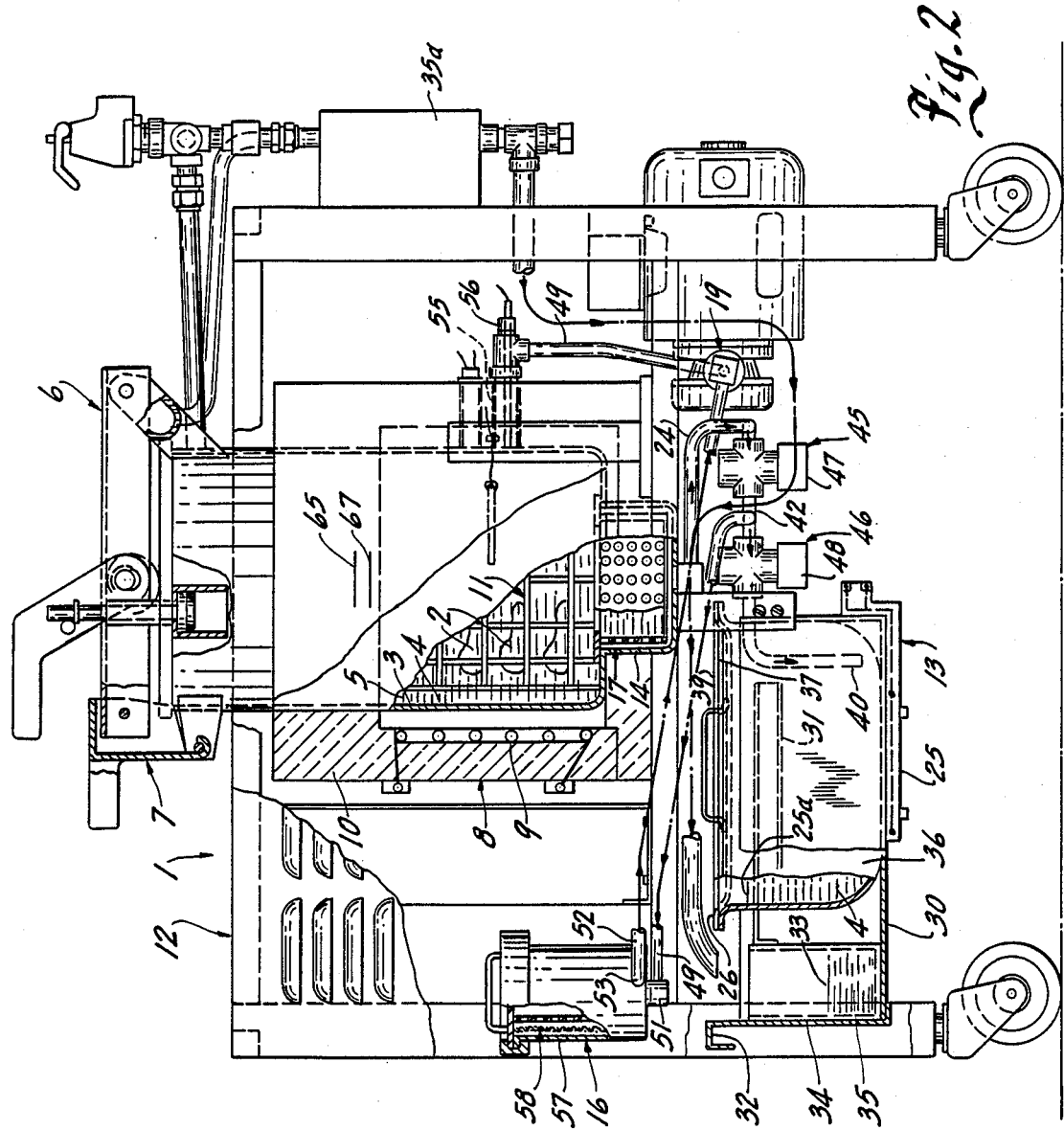
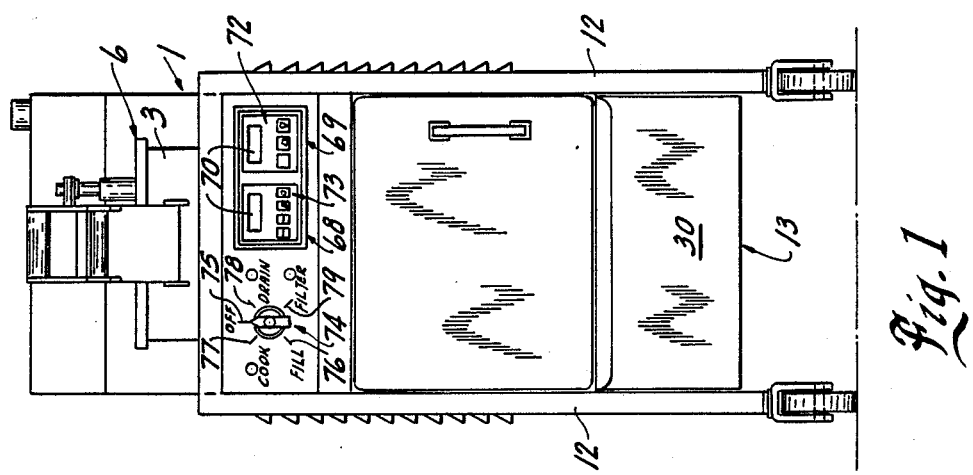

OIL FILTER APPARATUS AND METHOD FOR DEEP OIL PRESSURE COOKING APPARATUS

BACKGROUND OF THE INVENTION

This invention relates to filter apparatus and method for deep oil pressure cooking of successive batches of food and particularly to such oil filter apparatus and method to permit continuous use of the same oil.

A restaurant menu often includes chicken, fish and other foods which may be cooked or fried by immersion in hot cooking oil. Certain restaurants specialize in such foods, particularly deep cooked chicken. In addition to the conventional restaurant where the food is consumed on the premises, various restraurants and other food retail outlets have a substantial food carry-out business including chicken. In those restaurants and other outlets having large sales volume of cooked foods, a rapid and efficient cooker is essential in order to produce quality products at a reasonable and profitable cost.

The conventional apparatus for deep cooking includes a relatively large kettle or pot having a releasable high pressure sealed cover. The pot is filled with cooking oil to a level in spaced relation to the cover. A heating unit generally in the form of immersion heating elements or an encircling heat unit applied adjacent to the pot is operative to increase the temperature of the oil to the desired cooking level. As more fully disclosed in the inventor's copending application filed on even date herewith and entitled "Deep Oil Cooking Apparatus", the prior art pot structures and heating systems are costly and require substantial use of oil per pound of product cooked. The chicken is placed in a suitable basket for transfer and immersion into the cooking oil for deep cooking for a selected period and removable therefrom. For example, a widely used cooker includes a rectangular shaped pot of approximately 13–17 inches across and a similar depth. The cooker is adapted to maintain and cook approximately ten pounds of chicken parts in each cycle. The oil is raised to a temperature of 370° to 375° and the power may be cutoff just prior to placing the chicken in the pot or maintained. The chicken is then cooked for approximately eleven minutes and removed. Other commercial production units are constructed to operate with a continuous power supply and with the oil held at a temperature of at least 350° F. to prevent boiling of the oil, while others suggest heating of the oil to even higher temperatures.

In all cookers, a system is provided for periodic withdrawal of the oil from the cooking apparatus and replacement with a new batch of fresh oil. Systems for filtering of foreign material from the oil which is created during the cooking process have also been suggested. The filter systems generally provide an open top container within which the oil is "dumped". The container has a suitable filter unit across the container to remove foreign product. Thus, a consistant and flavorable product is dependent upon use of clean oil which has not been burnt, oxidized or otherwise broken down. Although such systems are widely used, the present inventor has recognized a number of features which contribute to inefficiency of the cooking apparatus, as well as unnecessary costs in operation and oil usuage.

The oil is held at the high temperature and the temperature and air in the cooker above the oil level may cause scorching of the oil. The oil is contaminated with foreign matter during the cooking sequence and in general practice the oil is periodically replaced with a fresh batch of fresh oil, which may have been preheated. The replacement of the oil combined with the necessity of heating the oil reduces the efficiency of system operation.

Prior art commercial units have generally used immersion heating elements projecting into the oil within the lower end of the cooking pot and operated at temperature of at least 350° Fahrenheit and in many instances at 375° to 400° Fahrenheit. The temperature at which oil will boil is approximately 360° Fahrenheit and the immersion units are operated as close to such temperature as possible without significant possibility of boiling. However, because of the high temperature, some scorching of the oil results with a degradation of the oil. Further, at such high temperature significant oxidation of the oil may occur whenever the cooker is opened to replace the chicken. This is a particular problem because of the relatively large exposed surface area in the large shallow cooking pots. In addition, when cooking breaded products such as deep cooked chicken, some of the breaded coating, drops from the chicken during the cooking process. The crumbs and even small pieces of chicken fall through the oil to the bottom of the pot, and in so moving some is often deposited on the heating elements. The coating on the heating elements not only reduces the heat input into the oil but results in increased scorching of the oil as the result of the excessive frying of the breading product. Generally, the present day commercial apparatus requires frequent discarding of the oil and replacing of the oil with totally clean new oil.

The cooking oil is a significant cost factor of commercial production of deep cooked food and operators are continuously monitoring and taken such action as possible to minimize oil usage. This may result in using of oil which is marginally acceptable and compromising with a somewhat lesser quality product. This is particularly true in operations which may be operated by managers rather than owners of the commercial operation.

The cost of the oil in the prior art devices is particularly significant because of substantial quantities of oil used to cook products and the associated relatively high energy levels required to heat the oil. Generally, in commercial production 55 to 60 pounds of oil are used for batch cooking of 10 pounds of product. A large heating units operating to produce 11 to 12 kilowatts of energy are necessary to produce the proper temperature and time cycle. The heating units are distributed over the large surface of the oil to minimize the wattage per square inch of surface and thereby minimize scorching of the oil.

Although various deep cooking pot units are used in the industry, there is a continuing need for a more efficient and effective batch pressurized cooking pot-type apparatus and method having means to minimize the amount of cooking oil required to produce large volume of cooked product while maintaining an rapid and energy efficient cooking process.

SUMMARY OF THE PRESENT INVENTION

The present invention is particularly directed to an improved integrated batch deep cooking apparatus including a pressurized batch cooking pot of relatively small volume or size with an oil filtering and recycling means for maintaining the oil in state for continuous use over a long period and for a substantial number of successive batches of product.

In accordance with the present invention, a deep oil cooking process for sequential cooking of food products includes heating a supply of oil to a temperature substantially below the cooking temperature to provide a partially heated liquid cooking oil. The low temperature oil is pumped into a cooking pot to a selected level. A plurality of successive batches of food product are cooked in the same oil in the pot, with the oil level being reduced as a result of product absorption. After the oil drops to a selected level, the oil is removed and prefiltered to remove the substantial majority of foreign solid matter. The refiltered oil is periodically mixed with stored oil. The mixed oil is filtered to remove micron size particles as the oil is transferred to the pot, and further plurality of batches of product is again cooked followed by the filter cycle corresponding to the above described filter cycle. In addition, the cooking oil may be periodically filtered between batch cooking cycles without addition of fresh oil. The sequence of batch cooking with an interposed filtering cycle and with periodic addition of fresh oil whereby the original cooking oil is used on a continuous basis.

Generally, in accordance with the teaching of the present invention, the cooking apparatus includes a suitable metal pot having a releasable, pressure cover. Cooking oil is contained within the pot to a suitable depth or level spaced from the pressure cover and with the volume and weight of oil only somewhat greater than the weight of the product being cooked. A heating unit is coupled to the pot to rapidly raise the oil temperature to the cooking temperature, and preferably by a radiant heater with the heat transferred through the pot wall to the oil. An oil reservoir unit is located adjacent and below said cooking pot. The reservoir unit is substantially closed except for a releasable cover to permit addition of new cooking oil, as well as for periodic cleaning. The bottom wall of the cooking pot has an outwardly extending prefilter chamber. A perforated basket unit releasably rests within the chamber and serves to capture the larger foreign particles. A drain line connected to the lower end of the prefilter chamber terminates in an inlet/outlet line to the reservoir unit. Two valve units are connected in spaced series relation in the drain line and are preferably electrically operated. Both valves are opened to gravity drain the oil from the pot into the reservoir. A recycle or fill line is connected to the drain line between the two valves. A micron filter unit is connected in the fill or return line and is operable to remove micron size particles from the cooking oil drawn out of the reservoir. A pump unit is connected in the return line to draw oil from the reservoir through said fine filter for filtering. A controller which may be manually set is provided for selectively energizing the valves for selectively draining oil from said pot and alternatively drawing oil from the reservoir and filtering the oil for filling the cooking pot.

In a preferred construction, the reservoir includes a support drawer within which a removable storage pan is located, with means to hold the oil in a liquid state. The pan has a top flange. A dished cover fits closely within the pan and includes a flange which rests on the top flange of the pan. This provides a relative substantial closure of the pan to protect the oil from the surrounding air and environment.

An essentially closed and dual filter system is thus coupled to the cooking pot to allow periodic time-spaced circulation of oil from the pot through a coarse filter means to a fine filter or to the source reservoir, and from the reservoir through the fine filter means for removing of micron sized particles prior to return of the oil back to the pot for purposes of filtering essentially all foreign matter. Additional clean oil from the reservoir is periodically mixed with the cooking oil from the pot and the mixed oil returned to the pot includes additional new oil for replacing the oil that is absorbed by the product. The oil reservoir is thus provided with at least sufficient fresh oil to replace the oil used in the in the successive batch cooking. The filter and recycling of the oil is in a rapid and effective sequence. Further, a low volume of oil is used for cooking of product, and advantageously is approximately in the ratio of less than two pounds of oil to one pound of product. During the cooking process, the product absorbs a small amount of oil. The amount of oil absorbed varies with the oil temperature and also with the pureness of the oil. Thus, vegetable oil is used for cooking. The meat product includes animal fat which breaks down into a rancid, accidic oil, particularly at higher temperatures. Although the presence of animal fat in the cooking oil in the pot cannot be avoided, the inventor has discovered that adverse effect can be significantly avoided by the features of the present invention, and can restrict the drop in the quality of the oil to a minimal and constant level. The present system with frequent addition of fresh oil as a significant percentage of filtered oil has been found to limit the degradation of the cooking oil to a relative minimal amount during initial product cooking, and thereafter remains essentially constant for a practically indefinite period of cooking of successive batches, with proper addition of the fresh vegetable oil. The inventor has found that the maintenance of the "sweet" oil condition is directly related to the absorption rate and the addition of fresh oil to replace the absorbed oil at frequent intervals, and generally after 5 or 6 batches of product cooked. This is in contrast to the conventional cooker which uses 55 to 60 pounds of cooking oil, and in which the inventor has found the degradation of the cooking oil is continuous with the cooking cycles. Thus, the proportion of fresh oil which is periodically added is an insignification factor and the high temperatures of the cooking oil prior to and during cooking not only create oil scorching and oxidation, but increase the adverse degradation created by significant addition of and breakdown of the meat product fats, which significantly contribute rancid and high aciditic fat to the cooking oil.

The combination of cooking at a relatively medium temperature and maintaining the oil in a highly clean or "sweet" state permits continued cooking with periodic filtering and addition of fresh oil to maintain the proper level for cooking without the necessity of total replacement of the cooking oil.

The present invention has been found to significantly contribute to prevention of degradation of the cooking oil and thereby avoiding the necessity of complete replacement of the cooking oil while maintaining the highest quality of cooked product and permitting mass production such as required for commercial fast food restaurants.

DESCRIPTION OF THE DRAWING FIGURES

The drawings furnished herewith generally illustrate the best mode presently contemplated for the invention and are described herewith.

In the drawings:

FIG. 1 is a front elevational view of a portable chicken cooker illustrating a preferred embodiment of the present invention;

FIG. 2 is a side elevational view of the portable chicken cooker shown in FIG. 1 with parts broken away and sectioned to show detail of construction;

DESCRIPTION OF THE ILLUSTRATED EMBODIMENT

Figures 3, 4, 5, 6:
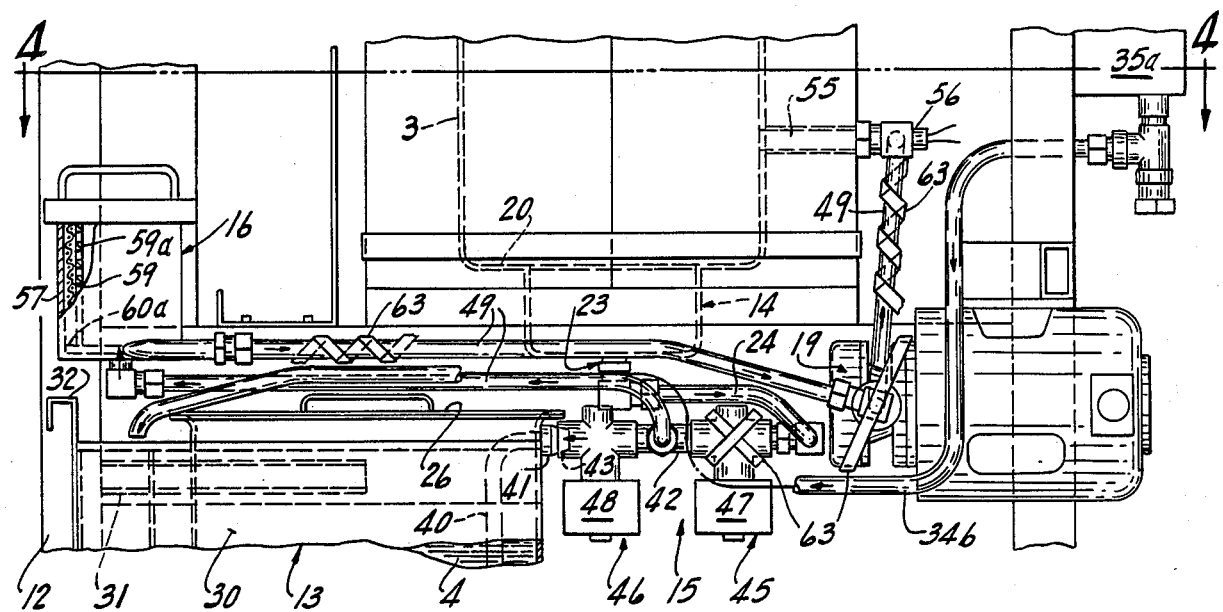
FIG. 3 is an enlarged side view to illustrate the oil filtering systems.
FIG. 4 is a separate elevational bottom view of the filter system shown in FIG. 3.
FIG. 5 is an enlarged view of a prefilter element.
FIG. 6 is an elevational view of a micron filter element.

Referring to the drawings and particularly to FIGS. 1-2, a portable deep oil cooker 1 is illustrated for sequential or successive deep cooking batches of breaded chicken parts 2 or other meat or fish product. The deep cooker includes an inner open-top cooking pot 3 mounted within a portable decorative and protective support structure. A cooking oil 4 fills the pot 3 to a selected level 5 in downwardly spaced relation to the upper end. A cover unit 6 is releasably, pressure sealed to the upper end of the cooker, with a latch mechanism 7 to tightly seal the cooker pot 3 and define a high pressure, deep oil cooker. A radiant heating unit 8 encircles the pot 3 for rapid and effective heating of oil 4. As more fully disclosed in the inventor's copending application, a heating unit 8 is preferably constructed with a heating coil element 9 embedded within an insulation shell 10 abutting the pot 3 and having a recess on the inner surface 14 in alignment with cooking oil level 5. The coil element 9 is embedded in the base wall of recess. The coil 9 and insulation 10 produce radiant energy which is transmitted to the pot 3 and therethrough to the oil 4 in an effective and efficient manner.

A multiple-shelf food basket 11 is adapted to be placed within the pot 3 and supports a batch of chicken parts 2 in vertically spaced relation immersed within the oil 4 for cooking. The basket 11 is removed and replaced with another for replacement of the cooked chicken with uncooked chicken.

The total assembly is housed within an outer wheeled cabinet 12, with the integrated pot 3 and heating unit 8 supported on a suitable support structure. An oil reservoir 13 is provided in the front and bottom portion of the cabinet 12 within which oil 4 is stored for subsequent use. The lower end of the pot 3 is provided with an outlet chamber 14 connected as a part of a prefilter unit in an essentially closed filteration system or unit 15 which includes reservoir 13, and a fine particle filter 16 for selected circulation of the oil 4 from and back to the pot 3, to remove foreign matter and to add a limited amount of fresh oil between batch cooking cycles of cooker 1.

In the operation, the oil 4 is raised to a desired operating relative or medium temperature such as within the range of 300° to 335° F. The basket of uncooked chicken 2 is placed in the cooker pot 3 and the cover unit 6 is closed and sealed. The heating unit 8 is maintained energized to rapidly bring and hold the temperature of the oil 4 to the desired cooking temperature and to hold such temperature until shortly before the end of the cooking cycle. The radiant energy is concentrated in that area of the cooking pot 3 filled with oil 4 and the free space above the oil does not rise in temperature significantly above such temperature. This significantly prevents scorching of the oil and contributes to use of the oil over long periods.

In accordance with the present invention, filtering of the oil 4 in pot 3 and replenishing with just enough fresh oil to replace that absorbed by the food product during the cooking cycle is periodically provided, after a selected member of batches of product has been cooked. The filtering system and method is an essentially closed system to isolate the hot oil from the air and thus an oxidizing atmosphere and is such that the cooking oil, with the addition of clean fresh make-up oil, maintains a clean "sweet" oil and permits continuous use of a given batch of oil over a long if not indefinite operating periods, and production of a large number of batches of product.

In the illustrated embodiment of the invention, filteration system 15 is constructed as an essentially closed filtering system having the chamber 14 connected to reservoir unit 13 for removing the oil 4 from the lower end of the kettle or pot 3. A prefilter element 17 is secured within chamber 14 of pot 3 and removes the larger food particles 18 from the oil 4. The oil 4 is then recirculated to the reservoir unit 13 and the prefiltered oil is mixed with the fresh oil 4 in the reservoir unit 13. The cooking oil in the pot 3 may also be circulated directly through the fine filtering unit 16 to the pot 3. A pump 19 unit provides for recirculation of the oil through the filtration system and from reservoir unit 13 with selective addition of oil to the pot 3.

The elongated cooking pot 3 and closed filteration system 15 allows the continuous cycling of the pressure cooker with minimal interruption of the cooking sequence. Thus, after a fixed number of cooking cycles, the oil level in pot 3 will drop below the maximum desired level as the result of the absorption of some oil by the product. Some decrease in level is permissible but in view of small volume of oil used, additional oil is necessary to maintain high quality production. The filtration system permits oil addition as well as proper cleaning of the oil 4 from pot 3 and thereby contributes to maximum time and cooking efficiency. The storage and make-up reservoir unit 13 is housed within the lower end of the outer cabinet 12 and oil 4 is gravity fed from the pot 3.

The present invention, in its various aspects, is particularly directed to the filter apparatus and method and the interrelationship to the other preferred constructions of the other components of the illustrated embodiment to minimize the oil used without adversely effecting the product quality. The various illustrated structures are described in such detail as to fully disclose the preferred construction and process based on the present novel teachings.

More particularly in the illustrated embodiment of the invention, the cooking pot 3 is especially formed having a relatively small diameter and elongated cylinderical depth, as fully disclosed in the previously identified copending application. The cooking pot 3 is shown formed as an integral tubular, round unit of a suitable metal such as stainless steel and is preferably formed as relatively heavy wall element such as of a 10 guage stainless steel. The depth of the cooking pot 3 is substantially a multiple of the width or diameter thereof. For example, in a practical construction, the depth to width ratio was substantially 1.8 to 1, and should be substantially at least 1.6 to 1 for optimum energy efficiency and proper oil proportioning. The elongated narrow pot 3 reduces the length the energy must move to the center of the batch of oil 4, and thereby promotes not only the rapid heating of all the oil to the desired cooking temperature but also produces a more uniform temperature in the oil across the cooking pot 3, as more fully disclosed in the inventor's copending application. Further, the small diameter of the pot minimizes the exposed surface of oil 4 and minimizes the oxidation exposure. In addition, the low volume of cooking oil 4 and the absorption of oil by product with periodic replacement establishes and maintains a "sweet" oil.

Pot 3 is formed as a slightly tapered bottom wall 20 having the integral, depending collector and prefilter chamber 14 in the center of wall 20. The chamber 14 forms a catch basin which is approximately half the width of the pot 3 and has a depth equal to approximately one-half its width. The prefilter element 17 is a small perforated basket, essentially corresponding in size to the chamber 14. The basket 17 is removably disposed in the chamber 14 and, as more clearly shown in FIG. 5 is formed of a perforated stainless steel sheet material. The openings may for example be ⅛ inch holes. A plurality of radial spokes 21 in the upper portion define a handle for removal of the basket 17 from the pot and recovery or removal of the solid matter 18 which accummulates in the basket. The basket 17 is removed during filter cycles, the filter product removed and the basket opening cleared if clogged. The large catch chamber 14 and particularly basket 17 functions as prefilter in the filtration system for removal of such foreign matter from the oil and reducing the degradation of the cooking characteristic of the oil. Generally, the basket 17 will remove on the order of 90 percent of solid matter created in commercial cooking of breaded chicken.

The bottom or base wall of the chamber 14 includes a pipe coupling 23 connected to an outflow or drain line 24 forming a part of the filtering system 15 for recycling of the oil in the pot 3, to the reservoir unit 13 where the used oil is mixed with the fresh oil in reservoir unit 13.

The oil 4 may originally be either a liquid or solid vegetable oil material. A solid shortening is often used because it is less costly. The oil, if solid, is generally chopped up and melted in the pot 3 or in the reservoir 13 and then transfered to the pot 3. The reservoir unit 13 includes a separate electric heating unit 25 secured to the bottom wall thereof. The oil 4 is heated at a relatively low level for storage. The use of the reservoir 13 is convenient because of its low temperature operation which may hold the oil at about 150° F. The preheated oil is then pumped to the pot 3 which is held at or above 200° F. standby temperature for subsequent heating to the operating temperature of 335° F. during one or more cooking cycles.

The oil reservoir unit 13 is specially constructed as an essentially liquid tight closed unit and preferably constructed to provide a minimum air space between the upper oil level 25a in the reservoir unit 13 and a removable cover 26 when containing oil sufficient to fill the pot 3 and/or replenish the oil absorbed during the cooking cycles. If the cooker 1 is shut down, the oil 4 is drained from the pot 3 into the reservoir 13 for storage. The oil is substantially isolated from the surrounding environment to again minimize oxidation of the oil such that the stored oil can again be used the next day for cooking of product.

The illustrated reservoir structure 13 consists of a rectangular supporting drawer 30 which is slidably mounted within the enclosure by a pair of oppositely located linear slide units 31. The drawer 30 is mounted in the bottom of the cabinet 12 beneath the pot 3. The front wall of the drawer 30 extends upwardly with a reverse hook portion 32 defining a handle for sliding of the drawer 30 into and from the cabinet. The forward portion of the drawer 30 includes a dividing wall 33 defining a front chamber of a relatively short depth. A drain overflow pan 34 is located within such shallow portion and is connected by drain line to receive the moisture and drain oil 35 from the cover and blow off tank 35a. The drain line 34b includes a trap defined by a U-shaped portion, as shown in FIGS. 3 and 4. The principal portion of the support drawer 30 extends beyond the small drain pan 34 and receives a larger reservoir pan 36 which projects upwardly above the drawer level slightly. The pan 36 is a relatively flat, shallow pan 36 which holds sufficient oil 4 to fill pot 3, the filtering system line and fresh replacement oil. For example, in a practical construction, the pan was constructed to hold approximately 25 pounds of oil with about two inches between the cover and the top level in the pan. The system including the pot 3 and the filtering piping held about 21 pounds of oil 4, with the pan holding fresh oil for periodic replacement. The reservoir pan 36 is located beneath the pot 3 in the inserted position of the drawer. The upper end of the pan 36 has an outwardly projected encircling flange 37. A dished cover 26 has an outer flange 39 corresponding to the pan flange and is adapted to be removably inserted projecting inwardly into the pan 36 with the cover flange 39 resting on the pan flange 37. The inwardly dished walls fits closely into the vertical wall of the pan 36 to effect a significant closure of the top of the pan. In a practical structure, the cover fit is such as to provide a liquid tight container.

An inlet/outet line 40 is secured to the back wall of the pan 36. The line or pipe 40 has its upper end mounted to the pan immediately beneath the flange 37, and extends downwardly adjacent the bottom of the pan for withdrawing of the oil 4 from the lower most end of the pan. The upper end of the pipe 40 extends out of the rear wall of the pan. A releasable coupling member 41 is secured to the upper end of the pipe 40 and abuts the backwall of the pan and is releasably connected to the end of an input/output line 42 by a complementing coupling 43 for connection in the filtering system, as more fully developed hereinafter.

In most operations, the cooker does not operate 24 hours a day and will normally be shut down at night. With the present invention, the oil 4 is drained and stored in the closed reservoir pan 36, with heating unit 25 turned off. The closed pan 36 with the minimal spacement between the top oil level 25a and the cover 26 minimizes any oxidation and degradation of the oil. The inventor has found that the same oil can subsequently be used essentially as if completely new oil were supplied when the system is recycled.

The illustrated filter system thus provides a particularly unique closed filter and recycling apparatus and for batch cooking of food and particularly maintains the oil in an extremely clean unscorched or "sweet" state, and thereby permits continuous and repeated use of the oil in the cooking pot over an essentially indefinite period. Scorching and oxidation of the cooking oil, as well as creation of high levels of meat fats are essentially eliminated. The system operates on a continuous basis of multiple batch cooking cycles and an interposed filtering cycle, with the only necessity being that of periodically replacing the small quantity of oil which has been absorbed into the product during cooking by mixing with fresh oil, as well as with a reasonable down time when the product demand is absent and during which the cooking oil is stored in the reservoir unit 13.

The illustrated filter apparatus includes the separate prefilter collector 14-17 secured to the bottom wall opening. Drain line 24 is connected to the center bottom of the collector. The drain line 24 and the collector are located above the level of the reservoir and the drain line 24 is conencted to the reservoir pan 36 and particularly inlet/outlet lines 41 and 42. The drain line 24 extends rearwardly from the collector chamber 14 and the outer end is connected by a first solenoid valve 45 and a second solenoid valve 46, which are connected in series to the flow line 42. The outer end of line 42 terminates in the complementing releasably 43. The solenoid valves 45 and 46 are similar units having the respectively electrically operating solenoids 47 and 48. With the reservoir drawer 30 slid fully into the cabinet 11, the coupling 41-43 is fully engaged and establishes a liquid tight connectin between the drain line 42 and the inlet/outlet line 41 of the reservoir pan 36. With both solenoids 47 and 48 energized, the drain valves 45 and 46 open and the drain system is opened from the pot 3 such that the oil 4 flows by gravity through the prefilter element or collector 17 into the reservoir pan 36.

An oil return and fill line 49 is connected to the drain system as at 50 between the first solenoid valve 45 and the second valve 46. The fill line 49 extends forwardly to the front of the cabinet 12 and the cooking pot 3 above the reservoir unit 13. The fine filter unit 16 has an inlet 51 connected to line 49 and is operable to remove extremely fine particles not shown, from the oil as it flows therethrough. The filter should be designed to remove particles on the order of 75 to 150 microns. A further portion of the fill line 52 is secured to the outlet side of the fine filter unit 16 as at 53 and extends rearwardly beneath the cooking pot 3 to the electrically driven pump 19, secured within the back portion of the cabinet 12. The pump 19 is any suitable pump operable to pump the hot oil, such as presently used in commercial cookers. The fill line 49 is shown connected to the suction side of the pump 19 and is operable to draw the oil upwardly through the line 42 and the solenoid 46 to and through the fill line 49, the fine filter 16 and the fill line 52. The discharge side or pressure side of the pump 19 is connected by a return line 54 which extends upwardly behind the pot 3 generally to the center of the oil chamber within the elongated cooking pot 3, thereby completely for return of the oil from the reservoir 13.

The return fill line 54 is coupled to an inlet pipe 55 which extends through the heating unit 8 and terminates in the wall of pot 3. A temperature sensor 56 is mounted in pipe 55 to monitor the temperature of the returned oil.

The filter unit 16 is shown as a removable cartridge type including a vertical oriented open top housing 57. The housing 57 is secured to the frame structure within the cooker cabinet 12. A cartridge filter 58 includes a tubular wire mesh 59 of stainless steel. The wire mesh 59 wound about a perforated cylinder 59a into a multilayer cylinder and is supported between top and bottom closure walls 60 and 60a having a diameter greater than that of the mesh tube. The upper wall 60 is larger than housing 57 and wall 60a and substantially corresponds to the inner diameter of the housing 57. The cartrudge 58 fits in the housing 57 with the wall 60 sealed to the outer end of the housing. The oil inlet 61 to housing 57 is at the center of the bottom wall such that the oil 14 is introduced through the center of the filter element and drawn radially outwardly through the filter element thereby removing even the finest suspended particles prior to being drawn passing through the pump and back through to the slot. The stainless steel filter element is easily removed for cleaning.

In the filter system, the prefilter basket element 17 provided in the depending collector will remove the larger particles constitute from approximately 90% of the foreign matter including the breading residue and any other relatively large particles. The final filter unit 16 functions to remove suspended micron size particles in the oil and may for example be constructed to readily remove particles of the size of 75-150 microns, depending upon the particular design of the filter mesh, the layers used and the like. In a commercial construction, the filter included 180 mesh of stainless steel. As the filter functions, partial clogging of the screen may increase the effectiveness thereof. Periodically, the cartridge is of course removed and cleaned because of excessive clogging. The result is an extremely "sweet" oil being transferred to the pot 3 and consisting of previous cooking oil and sufficient fresh oil to replace that absorbed by the product during the previous plurality of cooking cycles. Thus, the inventor has found that the cooker can operate over relatively long periods without the necessity for discarding any of the oil being used. For example, the inventor has cooked up to 1,200 pounds of chicken in 10 pound batches in a continuous cycling sequence. The batch cooking was interrupted after every fourth batch, the oil filtered and replenished. The oil even after cooking of the 1,200 pounds of chicken was found to be completely sweet and usuable. Thus there had been essentially no degradation of the cooking characteristic of the oil and particularly no scorching or other degradation, and only the periodice small addition to replenish the absorbed oil is required. The necessity of adding oil may be monitored by the operator.

The piping in the filter system and the pump are wrapped with a heating strap-like unit 63, as partially shown in FIGS. 3 and 4 to maintain the temperature of the oil during periods of temporary shut down of the cooker. During cooking, the heat generated by the operation maintains the oil in a relatively high temperature and a liquid state. During shut down, such as during night time, even though the oil is drained to the reservoir level, some oil will remain in the piping and pump systems. Without the heating oil of the system, the oil may solidify.

The oil 4 fills the pot 3 to a selected full fill level, which may be shown by a suitable mark 65 on the pot. Alternatively, the position of the hook element, on a basket hook for manual removable and placement of the food basket may be used as a reference for a full-fill oil level. The fill level 65 is selected to allow filling of the pot 3 with a selected quantity of chicken product 2 in the basket and maintaining a free space above the increased oil level. Generally, the oil fill level may be allowed to drop a given amount, such as typically within an inch of the maximum fill level 65, to a second level which may be shown by a mark identified as the add mark 67, or again the operator may visually note the spaced between the oil level and the basket hook element to detect the necessity for adding oil. In a practical structure, the pot was constructed with a total depth of 18 inches to the bottom wall and a width of nine inches. The full level line 65 was nine inches from the upper edge of the pot and the add line was one inch below the fill line. The pot was constructed to hold 18 pounds of shortening when filled to the full line, or 2 pounds per inch, and the add-full line difference was equal to one inch or 2 pounds.

The operation of the cooking apparatus is preferably provided with a suitable automated control and perferably a microprocessor based control for setting and controlling of the cooking cycle. The actual control system can be readily provided by those skilled in the art and a particular circuit and/or control system is not shown or described in detail. A brief description of a preferred control system based on the illustrated control panel on the front of the cabinet 11 as shown in FIG. 1 and with manual control of the filling and filtering of the oil is briefly described.

The control system will include a timing control for setting the time of a cooking cycle as well as a cooking temperature control. The control panel, shown in FIG. 1, is shown with a cooking time display and control panel 68 and a separate similar temperature display and control panel 69. Each panel is provided with a similar digital display 70 as well as a pair of control buttons 72 and 73 for raising and lowering of the respective parimeters. The temperature control would of course be connected into a control circuit unit such as a programmable controller to control the temperature of the cooking oil.

In addition, a manual control is provided for selectively establishing the particular operating mode as well as for turning the system off. The illustrated manual control is shown including a rotating dial know 74 settable in five different positions, including a central off position 75. To the left of the off position a fill position 76 and a cook position 77 are provided. In the fill position 76, the system operates to open valve 46 and energize the pump 19 to transfer oil 4 from the reservoir unit 13 to the pot 3 with fine filtering provided by the fine filter unit 16. The operator may visually monitor the fill cycle and turn the control to off when the proper full level is reached. In the cooking position, the processor is actuated to provide the automatic timed cooking of the chicken.

To the right side of the off position, a drain position 78 and a filter position 79 are shown. In the drain position, the two solenoids 45 and 46 are energized and the oil 4 is transmitted directly to the reservoir pan 36 for storage. In the filter position 79, the control system opens valve 45 open, with valve 46 closed, to recycle the pot oil 4 through the coarse filter 14 and the fine filter 16 to remove foreign matter. The operator will visually monitor the drop in oil and when necessary move the control to the fill position to raise the oil to the full level in for the the pot 3 with fresh oil, with the proper filtering as previously discussed.

The high temperature cooking oil is particularly subject to degradation as a result of oxidation. Thus, whenever a hot cooking oil 4 is exposed to the atmosphere, some oxidation will occur, with a corresponding degrading of the cooking oil characteristic. The degradation is also generally directly related to the temperature level and increases with the temperature level. In the normal operation, the oil is thus not only subjected to some level of degradation during each cycle of removal and replacement of the food product, but is further subject to degradation during the normal filtering cycle.

The low level temperature of 300° to 335° which is preferably used with the small elongated pot 3 and the essentially closed reservoir pan 36 provides the rapid and thorough cooking of the chicken or other food products without oil degradation, subject to maintaining the cooking oil clean or as generally referred to as a "sweet" oil. Further, this low level of oil relative to the weight of meat product results in addition of a significant quantity of fresh oil at periodic add periods, and maintains effectively "sweet" oil, as generally referred to the trade for a oil which produces a high quality product.

The present invention in the preferred construction of the various components as more fully setforth in the copending application can operate on a production basis using 18 pounds of shortening for successive batch cooking of 10 pound batches of breaded chicken parts. A total cooking cycle requires approximately 12 minutes for cooking, and permits cooking in excess of four loads per hour including periodic recycling and filtering of the oil during each hour.

In summary, the operation of the illustrated embodiment, the oil is introduced into the reservoir either in liquid or solid form. If solid oil is used, the heating element 9 is energized to melt the oil perferably at somewhat reduced temperature, and establish the desired liquid level in the reservoir. The oil is pumped to pot 3, passing through the micron filter, and the cover is secured to the pot and the heating elements are energized. The oil 4 is then heated to the desired level, generally corresponding to the maximum cooking temperature. Although, typical requirements of present day cookers are in the range of at least 350 degrees Fahrenheit, the present inventor is of the opinion and prefers to operate the cooking apparatus at a maximum temperature in the range of 300 to 335 degrees Fahrenheit. With the oil at the cooking temperature, a basket of the food product such as breaded chicken is introduced with the oil rising upwardly over the uppermost layer of the food product. The cold food tends to cool the cooking oil, and the heating coil 9 is energized during essentially the total cooking cycle to maintain the temperature at the desired cooking level and held at a cooking level and held at a cooking level for a for a selected time, usually until the last minute of the cooking cycle. At the end of such time, the heating element is deenergized and the unit is allowed to continue cooking with the cover in the closed position. At the end of the cooking cycle, the pressure in pot 3 is released and cover unit 6 is opened, the basket of cooked chicken 2 is lifted from the pot and held over the top such that excess oil drains back into the oil bath. The draining period is in the order of two minutes. During this period all excess oil returns into the pot to minimize the replacement.

After four batches, the cooking cycle is interrupted and the oil 4 is drained from the pot 3 by engaging both of the solenoid valves and 45 and 46. The oil passes through the filter basket 17 of the prefilter unit as the oil drains to the covered storage pan 36. The prefilter removes on the order of 90 percent of the solid foreign matter as a usuable byproduct. The cooking oil is mixed with fresh oil in the storage pan 36. After complete draining of the oil, the filter basket 17 is removed, the material 18 removed and the basket cleaned and replaced. The solenoid valve 45 is de-energized to close the drain connection to the prefilter unit 17 and the pump 21 is energized. The oil from pan 36 is now passed through the fine micron filter to remove essentially all foreign matter from the oil 4 and pot 3 is filled to the full line level. The cooker is then again operated to cook a similar plurality of batches of chicken before another filtering cycle is completed.

The filtering and adding of oil preferably is provided in various sequences and cycles during the multiple batch cooking process. Thus depending upon the product being cooked, the operator may desirably filter the cooking oil after each couple of batches. This process is established by the operator moving the control knob to the filter position at the end of a cooking cycle. The valve 46 will open while valve 45 will remain closed. The pump 19 will be energized and circulate the oil from the bottom of pot 3 through the filter unit 14 and directly through the fine filter unit 16 and return the oil to pot 3. The operator terminates the filtering by returning of the control knob to the cooked position and proceeds with the next batch or batches of product cooking.

After a number of batches, the operator will monitor the oil level. When it drops a selected amount such as previously discussed, the operator will operate the system to provide fresh oil from the pan 16 to fill the pot 3 to the desired full level and thereby establish the unit for subsequent heating and batch cooking of product. Generally, it will be found that for example with cooking of breaded chicken, after 5 or 6 batches addition of fresh oil will be required to maintain optimum functioning of the system. Periodically the pot is drained to permit cleaning of the filter 17. Thus the course filter removes the greater share of product and will more frequent cleaning.

The fine filter unit 16 will also require periodic cleaning. Its operation of course is to remove fine particle material. With slight clogging of the unit, it will tend to provide an increased filtering function. However, as the filtering increases it will reach a stage where it impeads the oil movement to such an extent that cleaning will be required. Cleaning is readily provided by removing of the filter cartridge and appropriate washing of the filter to remove the foreign material and replacement for recycling. The filter 18 is above the level of the pan 36. Consequently, opening of the drain valves 45 and 46 will appropriately function to drain not only the pot 3 but the fine filter unit 18 permitting the removal and cleaning of the cartridge.

Thus the present invention with the closed filtering system and with the alternate pads including the reservoir and bypassing the reservoir permits the operator to maintain maximum efficiency in the system cooking.

Further with the wrapped special heater wrap provided on the piping valves and pump and the like associated with the assembly and the special low temperature heater 25, the oil is properly stored for relatively short periods such as overnight without degradation or adverse deterioration of the cooking oil. Stirring such storage periods, the drain valves 45 and 46 are opened and held open to completely drain the system into the storage unit. However it must be recognized that the cooking oil may well tend to be retained within certain recesses, crevices and connections within the system of the piping system between the reservoir and the cooking pot. Although the quantity of oil so retained may not be great it can be insignificant amounts if allowed to solidify. In many environments and particularly other than warm climates and periods of the year, temperature during the night time will normally drop below the solidification temperature of the vegetable oil. Degradation of the oil can readily occur because of its exposure to the atmosphere within the system. Further, if it is rapidly heated to a high temperature the following day upon initiation of cooking, scorching can readily occur. The present invention with the continuous heating provided by the heat wrap or any other suitable system prevents the solidification of the oil and maintaining of the oil in allowing the oil to continuously drain down into the storage compartment with minimum exposure to the atmosphere. When the cooking cycle is again initiated, the partially heatedil is slowly raised in temperature to the standby temperature such as 200° F. or above, upon being transferred to the cooking pot to positively prevent the possibility of adversely effecting the cooking quality of the oil.

In an optimum procedure for deep oil pressurized cooking of product, the system is operated to insert and remove the product with the oil removed from the cooking pot 3. In this procedure, the cooking oil 4 is removed by opening of both valves and draining the oil. The product is placed in the pot, the cover part in place and valve 46 is opened and proper volume of oil is pumped through the valve 46, fine filter 16 and the pump to the pot. Any suitable monitor can be provided or the oil in the reservoir can be visually monitored to transfer the proper amount. The oil is then heated to cook the product. At the end of the cooking cycle, but with the cover in the sealed position, the oil is again transferred to the reservoir. Only then is the cover removed and the cooked product removed. Thus, the valve structure permits the selective transfer of the oil through a direct filter cycle independent of the reservoir as well as through the reservoir and thereby providing for various sequences to establish and maintain an optinum cooking cycle as well as providing a continuous "sweet" oil state of the oil in the system.

The unique filtering and recycling system and method significantly contributes to a continuous production of a high volume of product, without necessity of a significant shut down time for replacement of oil, and/or cleansing of the equipment and pot structure. Although the inventor does not claim that the recycling can be maintained on a continuous cycling for an indefinite period. The novel unit can be operated over periods which are a substantial multiple of any period heretofore used. Eventually, as a matter of high quality control, the system will be shut down and the pots and lines thoroughly cleaned. For example, in a commercial fast food restraurant, the system should be approximately thoroughly cleaned. The system will be then re-initiated and operates again for long period of time without the necessity of shut down maintenance or servicing shut down.

Various modes of carrying out the invention are contemplated as being within the scope of the following claims particularly pointing out and distinctly claiming the subject matter which is regarded as the invention.

I claim:

1. A deep cooker filtering apparatus for cleaning and replenishing cooking oil, comprising a pressure cooking pot having a releasable cover and adapted to contain a preselected level of cooking oil under pressure for deep cooking of food product, a reservoir located adjacent said cooking pot and below said cooking pot, said reservoir being substantially closed and having a releasable cover for addition of new cooking oil, a prefilter unit connected to the bottom of said pot and operable to remove food particles from said oil, a drain line connected from the lower end of said prefilter unit and terminating in said reservoir, first and second valve means connected in spaced series relation in said drain line, a return line connected to said drain line intermediate said first and second drain valves, a fine filter unit connected to said return line and operable to remove minute size particles from said oil, means connected to said return line and to said pot and operable to transfer oil from said reservoir through said fine filter and deliver the same to said cooking pot and to cycle said oil in said pot through said prefilter unit and said pine filter unit and to said pot.

2. The apparatus of claim 1 wherein said valve units are electrically operated, control means for selectively energizing said solenoids for selectively draining oil from said pot, transfering oil from said reservoir to said pot and circulating oil from said pot directly through said prefilter unit and said fine filter unit.

3. The deep cooker filtering system of claim 1 wherein said reservoir unit includes an upwardly opening storage pan, and said cover is a dished member having a wall corresponding to said pan and telescoped into said pan to seal in the cooking oil.

4. The filter system of claim 1 wherein said fine filter unit includes a housing, a cartridge filter in said housing and formed of mesh material.

5. The filtering system of claim 1 wherein said prefilter unit includes a chamber projecting downwardly from the center of said pot, and a perforated filter basket releasably located in said chamber.

6. A pressurized deep cooking filtering apparatus for cleaning and replenishing cooking oil, comprising a cooking pot having a releasable cover and adapted to contain a preselected level of cooking oil for deep cooking of food product, said cooking pot having an inlet means for introducing oil into the pot, an oil storage means located adjacent said cooking pot and below said cooking pot, said oil storage means being substantially closed and having a releasable closed opening for addition of fresh cooking oil, a prefilter unit connected to the bottom of said pot and operable to remove food particles from said oil, a micron filter unit connected to said inlet means and operable to remove micron size particles from said oil, flow line means connecting said prefilter unit to said storage means and to said micron filter unit, first and second valve means connected in spaced series relation in said flow line with said micron filter unit connected intermediate said first and second valve means and means connected to said valve means to control transfer of oil between said storage means and said pot and the oil in said pot through said prefilter unit and said micron filter unit.

7. The apparatus of claim 6 wherein said valve means have controlled operators, and control means for selectively operating said valve means for selectively draining oil from said pot to said storage means, transferring oil from said storage means to said pot, and circulating the oil from the pot directly through said prefilter unit and said micron filter unit.

8. The apparatus of claim 7 having low temperature heating means coupled to said storage means and said flow line means to separately heat the oil within said system to a level below the level in said cooking pot and thereby prevent solidification of the oil in the flow line during periods with the oil in said storage means.

9. The filtering apparatus of claim 8 wherein said heating means includes a heating unit coupled to said storage means and a separate flexible strip heater wrapper about the flow line means and said valve means to maintain the temperature of the oil.

10. The filter apparatus of claim 9 wherein said micron filter unit includes a housing, a cartridge filter in said housing and formed of a mesh material, said prefilter unit includes a chamber projecting downwardly from the center of said pot, and a preforated filter basket releasably located in said chamber.

* * * * *

UNITED STATES PATENT AND TRADEMARK OFFICE
CERTIFICATE OF CORRECTION

PATENT NO. : 4,768,426

DATED : September 6, 1988

INVENTOR(S) : LOUIS A. NETT

It is certified that error appears in the above-identified patent and that said Letters Patent is hereby corrected as shown below:

Claim 1, col. 15, line 11, delete "pine" and substitute therefor ---fine---.

Signed and Sealed this

Fifth Day of September, 1989

Attest:

DONALD J. QUIGG

*Attesting Officer*  *Commissioner of Patents and Trademarks*